United States Patent [19]
Rigdon et al.

[11] 3,717,561
[45] Feb. 20, 1973

[54] PHOTONITROSATION OF NORMAL PARAFFINS

[75] Inventors: Orville W. Rigdon, Groves; Robert S. Edwards; Edward H. Holst, both of Nederland, all of Tex.

[73] Assignee: Texaco Inc., New York, N.Y.

[22] Filed: March 15, 1971

[21] Appl. No.: 124,473

Related U.S. Application Data

[63] Continuation-in-part of Ser. No. 674,612, Oct. 11, 1967.

[52] U.S. Cl. ............................................204/162 XN
[51] Int. Cl. ...............................................B01j 1/10
[58] Field of Search ............204/162 XN; 260/566 A

[56] References Cited

UNITED STATES PATENTS

| | | | |
|---|---|---|---|
| 3,578,575 | 5/1971 | Rigdon et al | 204/162 XN |
| R25,937 | 12/1965 | Ito | 204/162 XN |
| 3,048,634 | 8/1962 | Mueller et al | 204/162 XN |
| 3,129,155 | 4/1964 | Ito et al | 204/162 XN |

*Primary Examiner*—Benjamin R. Padgett
*Attorney*—Thomas H. Whaley and Carl G. Ries

[57] ABSTRACT

A process for producing normal paraffin oximes and, in particular, normal paraffin oximes having from 10 to 13 carbon atoms wherein a $C_{10}$ to $C_{13}$ normal paraffin is photochemically reacted with a gaseous nitrosating agent where the photolytic reaction is conducted under the influence of a sodium arc lamp producing light in the wavelength of about 380 millimicrons to about 760 millimicrons and preferably where the principal emission spectra is from about 550 to 650 millimicrons.

10 Claims, No Drawings

PHOTONITROSATION OF NORMAL PARAFFINS

CROSS REFERENCE TO RELATED APPLICATION

This application is a continuation-in-part of our copending application Ser. No. 674,612, filed Oct. 11, 1967 titled "Photonitrosation of Normal Paraffins."

BACKGROUND OF THE INVENTION

This invention relates to a process for producing oximes. In particular this invention relates to the manufacture of high molecular weight oximes by photochemically reacting a higher molecular weight normal paraffin and a nitrosation agent.

The preparation of low molecular weight cycloaliphatic oximes by photonitrosating cycloalkanes is known and disclosed in U.S. Pat. Nos. 3,129,155; 3,309,298, and RE 25,937. Substituting higher molecular weight normal paraffins, that is, normal paraffins having from 10 to 13 carbon atoms in the above known procedures, resulted substantially in the formation of ketones or amides. Continued investigation into the applicability of these procedures when photonitrosating higher molecular weight normal paraffins confirmed that at best only low yields and low selectivity to the corresponding oximes resulted. Moreover, from a commercial sense these processes were not only economically unattractive but impractical.

It is therefore an object of this invention to provide an efficient process for the preparation of oximes from normal paraffins.

Another object of this invention is to provide a process for the preparation of oximes from normal paraffins in high yields.

Yet another object of this invention is to provide a process having high selectivity for the preparation of oximes from normal paraffins.

A further object of this invention is to provide a photolytic process employing efficient light sources.

Other objects and advantages will become apparent from a reading of the following detailed description and examples.

SUMMARY OF THE INVENTION

Broadly, this invention contemplates a process for the manufacture of normal paraffin oximes which comprises:

a. photochemically reacting a normal paraffin having from 10 to 13 carbon atoms with a gaseous nitrosating agent selected from the group consisting of nitrosyl halides, nitrosyl sulfuric acid, nitrogen oxide and chlorine, nitrogen peroxide and chlorine each alone and in admixture with hydrogen chloride, where said nitrosating agent partial pressure ranges from about 125 to 625 MM Hg under the influence of a sodium arc lamp providing essentially all light emission at a wavelength from about 380 millimicrons and up to about 760 millimicrons, b. separating unreacted normal paraffin and the reaction products of (a), c. neutralizing said separated reaction products of (b), and d. separating and recovering normal paraffin oximes.

The paraffin hydrocarbons contemplated in this invention are straight chain aliphatic hydrocarbons containing at least 10 carbon atoms and particularly n-paraffins having from 10 to 13 carbon atoms. Such hydrocarbons include n-decane, n-undecane, n-dodecane, n-tridecane, and mixtures thereof. Typical paraffin hydrocarbon mixtures applicable to this invention include hydrocarbon mixtures comprising 10 to 13 carbon atoms which are obtained from middle distillates by adsorption in molecular sieves.

Applicable nitrosation agents or components of nitrosating mixtures include, nitrosyl halides, nitrosyl sulfuric acid, hydrogen halides, halogens, nitrogen oxide, nitrogen peroxide, etc. Mixed nitrosating agents such as nitric oxide and chlorine are similarly contemplated in molar ratios, for example, ranging from 3:1 to about 1:1. The nitrosating agent may be diluted with hydrogen chloride, nitrogen, or other gases inert to the photolytic reaction. Mixtures of inert gases is also contemplated.

An important aspect of this invention relates to the concentration of nitrosating agent dissolved in the normal paraffin during the course of the reaction. The concentration, best expressed in terms of photonitrosating agent partial pressure, must be controlled within narrow limits so as to provide high oxime yield. It has been found that when the photochemical reaction is carried out under a partial pressure of nitrosating agent ranging from about 125 to 625 and preferably between 200 and 400 mm Hg, high molar yields of oxime up to 92 percent and higher can be realized. Partial pressures below 125 mm Hg and above 625 mm Hg significantly reduced oxime formation.

In another embodiment related to the high conversion of normal paraffin to the corresponding oxime, the reaction is permitted to proceed under the influence of light of selected wavelengths influencing both oxime selectivity and yield. Investigations have shown that exclusion of wavelengths shorter than 200 millimicrons and preferably excluding wavelengths below 280 millimicrons materially alter the process and product formed thereby. Experiments conducted employing normal paraffins within the ranges stated above and nitrosyl chloride as reactants under the influence of unfiltered and filtered light, resulted in an oxime selectivity of only from 10 to 40 percent with unfiltered light including wavelengths shorter than 200 millimicrons, the remainder being primarily ketones. Where filtered light was employed selectivity to the corresponding oxime was 93.5 percent. Moreover, filtered light not only materially affected selectivity but additionally and significantly affected yield. In the same experiment it was observed that oxime formation rate was approximately 50 percent greater under the influence of light excluding the shorter wavelengths than under the influence of light permitting all wavelengths emitted from a mercury arc lamp to influence the reaction.

Filtered light may be provided to the reaction zone in a number of ways. For example various glasses capable of inhibiting the passage of undesired wavelengths may be employed, that is, the reaction walls may consist of such materials or a glass filter may be interposed between the light source and the reaction zone. Among the filtering glasses which may be employed we mention Pyrex 7740, Corning glass Nos. 0160, 7380, 3850 and Corex 9700 and in general those glasses inhibiting ultraviolet light transmission of wavelengths of below 200 millimicrons and preferably below 280 millimicrons.

In a highly preferred embodiment, we employ a sodium arc lamp where essentially all light emission is at a wavelength of from about 380 millimicrons to about 760 millimicrons. The use of the visible radiation is desirable for photonitrosation in view of the higher quantum count, that is photons per watt, which in turn provides increased oxime production. In addition to minimizing byproduct formation during photonitrosation of n-paraffins, the sodium arc lamp permits greater photonitrosation efficiency by converting more of the electrical power consumed to light having a wavelength of from about 380 to 760 millimicrons. Preferably at least 50 percent of the emission of the lamp has wavelengths of from about 550 to 650 millimicrons. In contrast to the mercury arc lamps where short wavelength radiation is filtered out resulting in a substantial loss in efficiency, the sodium arc lamps contemplated herein require no filtering devices and employ to full advantage the total radiated power. Further, more than twice as much input power is converted to usable light in the range of 380–760 millimicron in sodium arc lamps as compared to mercury arc lamps. While sodium arc lamps in general may be employed including those producing nearly monochromatic radiation in the range of 578 to 600 millimicrons, we prefer to employ those having an emission spectrum considerably broader where at least 50 percent of the lamp emission is in the wavelengths of from about 550 to 650 millimicrons.

An additional embodiment further influencing yield and selectivity relates to the use of a polybasic acid such as sulfuric or phosphoric acid, flowing along the surface of the reaction vessel. Sulfuric acid has previously been suggested as a means for carrying out continuous reactions without the occurrence of deposits inhibiting the transmission of light. By excluding wavelengths below 200 millimicrons and preferably below 280 millimicrons we significantly prolong on-stream time before deposition interferes with light transmission and in turn with the reaction. We have found it beneficial to contemporaneously provide an intermittent or continuous flow of sulfuric or phosphoric acid over the reactor wall, particularly the light transmitting wall. Such flows have not only materially assisted in inhibiting by-product deposition on the reactor wall but have substantially influenced the course of the reaction. However, not all concentrations of sulfuric or phosphoric acid have been found to be beneficial when n-paraffins of the type described herein are employed. While the art has suggested, for example, that any sulfuric acid concentration over 4 percent, that is, dilute, concentrated or fuming sulfuric acid may be employed, we have found that only a concentrated sulfuric or phosphoric acid and particularly acids of from 85 to 98 percent, preferably 95 to 98 percent, are permissible in the instant process. Employing dilute acids, i.e., 4 to 20 percent sulfuric acid, has prevented the photolysis reaction from occurring to a significant extent and in some instances no reaction at all took place. Fuming sulfuric acid on the other hand has suppressed oxime formation with resulting ketone and amide formation. Operable ranges stated above, which we term concentrated acids, surprisingly provide not only prolonged reactions free of optically interfering deposits but provide isolatable oximes. Further, when the concentrated acid flow is utilized in combination with sodium arc lamp, a higher conversion in terms of weight of product per kilowatthour is realized along with selectivity such that approximately 95 percent of the ultimate converted material consists of oximes, the remainder being predominantly ketones in the range of 3 to 5 percent.

In accordance with our invention the oxime is prepared by admixing a nitrosating agent such as a nitrosyl halide, particularly nitrosyl chloride and preferably with nitrogen and hydrogen chloride as diluent gases. The nitrosating agent is next contacted with a $C_{10}$ to $C_{13}$ n-paraffin at a temperature ranging from about 32° to about 110°F., preferably between 50°and 80°F., in the presence of concentrated polybasic acid, preferably sulfuric acid, flowing along the reactor surface and actinic light excluding wavelengths below 200 millimicrons. In operation, the conversion product comprises approximately 95 percent of the n-paraffin oxime salts of hydrochloric acid along with approximately 4 percent of nitrosoalkyl chloride and approximately 0.2 percent of alkyl chloride. To achieve maximum light utilization the n-paraffin is exposed to a light source contained in a glass water-cooled immersion well. Under the operative conditions, oxime hydrochlorides precipitate to the bottom of the reaction vessel as an oily layer where they may be continuously removed. The oximes are subsequently sprung by neutralizing the oxime hydrochloride with aqueous ammonia, caustic soda or other base. In general, a typical apparatus consists of a reactor equipped with a quartz immersion well containing a mercury arc lamp fitted with a light filtering means intermittent the light source and the reaction zone whereby wavelengths of less than 200 millimicrons are precluded from influencing the reaction. In place of mercury arc lamps any source producing light in the wavelengths range of 200 to 760 millimicrons may be employed including xenon arc, thallium arc, sodium arc and the tungsten incandescent lamp. By filtering out wavelengths below 200 millimicrons, undesirable byproduct deposition on the light source decreases while concommitantly increasing oxime yield. In our highly preferred embodiment, sodium arc lamp is employ emitting wavelength of from 380 to 760 millimicrons thereby permitting the photolytic reaction to take place in an apparatus as described above except that a light filtering means may be excluded.

Following the reaction, the reaction effluent is degased, preferably under vacuum, and any unreacted gaseous nitrosating agent is recovered and recycled to the reaction. During the photolytic reaction, concentrated sulfuric acid (85 to 98 percent) is continuously passed over the quartz well reaction surface thereby removing and inhibiting the build-up by-product deposition. Inasmuch as the well cleaning sulfuric acid reacts with the oxime hydrochlorides, nitrosoalkyl chlorides and alkyl chlorides to produce sulfuric acid reaction products, these products are subsequently released from their complex with sulfuric acid by first extracting the nitrosator effluent with a low boiling hydrocarbon such as cyclohexane, n-pentane, low petroleum ether or isoheptane, to remove unreacted n-paraffins. In continuous operations the unreacted paraffins are recycled to the nitrosator and the paraffin denuded effluent is thereafter contacted with aqueous ammonia or gaseous ammonia at a temperature ranging from about 32° to 140°F., preferably from about 60° to 110°F., thereby separating the oxime and an aqueous ammonium sulphate.

Approximately three volumes of cyclohexane or other low boiling hydrocarbon of the type mentioned above are mixed with the salts during neutralization to facilitate the separation of the oximes from the aqueous phase. Substantially all of the inorganic salts from neutralization are contained in the aqueous phase and additional water washing may be employed to remove the remainder of the inorganic salts. The cyclohexane phase from the neutralization reaction contains the oximes along with minor amounts of byproducts. The oximes may be recovered by blotter filtration and evaporation of the hydrocarbon under reduced pressure. Where desired the hydrocarbon may be condensed and recycled for reintroduction to the extraction or neutralization stages.

Oximes produced in this manner from $C_{10}$ to $C_{13}$ n-paraffins are valuable as engine oil additives, anti-icing agents, fuels, rocket propellants, fungicides, herbicides, and insecticides and have application in such areas as pharmaceuticals, ore flotation, plastics and detergents. Moreover, the oximes may be hydrogenated to amines or converted to amides by Beckmann rearrangement as well as various other derivatives as by reaction with ethylene oxide to ethoxylates and with ethylene imine to ethaminates. Further, the oximes may be hydrolyzed to yield ketones which are in turn hydrogenated to yield secondary alcohols.

In order to more fully illustrate the nature of our invention and manner of practicing the same the following examples are presented.

EXAMPLE I

The apparatus employed to photonitrosate $C_{10}$ and higher n-paraffins consisted of a 12-liter flask equipped with a quartz immersion well containing a 550-watt high pressure mercury arc lamp. The immersion well was water jacketed to provide cooling to the lamp. A glass tubing containing a terminal fritted glass gas dispersion tip was used to deliver reactant gases to the bottom of the immersion well. Product and acid layer removal was accomplished by pumping off from the bottom of the reactor. Cooling of the normal paraffin phase was accomplished by circulation through a laboratory condenser connected to a chilled water circulation pump. Unreacted vent gases were lead to a caustic scrubber. A glass sparging ring located near the top of the immersion well was used to deliver a film of acid to the immersion well surface for cleaning purposes. Charging funnels were used to supply normal paraffins and fresh acid as needed. The sulfuric acid solution to be used for cleaning the immersion well surface was added to the reaction flask to a level just below the fritted glass dispersion tip and normal paraffins were then added to the vessel until the level reached the top of the mercury arc lamp. Cooling water to the immersion well jacket was started as well as circulation of the normal paraffin through its cooling loop after which the reaction vessel was wrapped with aluminum foil to provide an internal light reflecting surface. When the paraffins reached the desired operating temperature the mercury arc lamp was turned on and allowed to reach full operating intensity before introducing the nitrosating gas mixture. This mixture consisted of nitrosyl chloride, hydrogen chloride, and nitrogen in metered proportions. Circulation of the bottom acid layer through the glass sparging ring was then started and adjusted so to provide an even wash film on the immersion well. The reaction was terminated by turning off the mercury arc lamp and gases and allowing the oxime salts to precipitate completely. Examples utilizing filtered light employed a Pyrex 7740 glass tube of two millimeters thickness. Approximately 60 milliliters of 98 percent sulfuric acid per hour were sparged onto the immersion well surface at 20 minute intervals for periods of 3 to 5 seconds. This was found sufficient to maintain an optically clean surface at all times. Sulfuric acid and oximes salts were removed from the reactor bottom and additional normal paraffins were added to replace those used. By this means an efficient continuous reaction was afforded. Upon leaving the reactor the mixture of oxime salts and sulfuric acid was degassed by agitating under vacuum. During this operation the oxime hydrochlorides were converted to oxime sulfates and the liberated HCl was removed along with previously dissolved HCl and NOCl. Sufficient sulfuric acid was present on a 1:1 mole ratio to free the bound HCl so as to recover and recycle the HCl back to the reactor. Small amounts of normal paraffins, approximately 10 percent, entrained in the precipitating oxime salts was removed by extracting the degassed salts with cyclohexane and the n-paraffin was recovered for recycle by evaporation of the low boiling hydrocarbon solvent. The n-paraffin denuded extracted oxime salt was thereafter neutralized with aqueous ammonia. Approximately three volumes of cyclohexane was mixed with the salts during neutralization to facilitate separation of the oximes from the aqueous phase. The aqueous phase contained the inorganic salts from neutralization, ammonium sulfates, traces of ammonium chloride and additional water washing removed the remainder of the inorganic matter.

In those examples employing a sodium arc lamp the equipment and procedure was the same except that a 10-gallon reactor was employed, cooling was accomplished by a cooling coil within the photoreactor and 60 ml sparging once each hour was undertaken employing concentrated sulfuric acid immersion well wash.

In a series of runs, the relationship between the nitrosating agent partial pressure and oxime productivity employing HCl and nitrogen as diluents was made at constant NOCl charge rates and various partial pressures. At an NOCl charge rate of 0.010 mole per minute and by varying the partial pressure of NOCl from 100 to 600 mm Hg, maximum oxime formation occurred between 200 to 300 mm Hg partial pressure with operative limits of from 125 to 450 mm Hg. At an NOCl charge rate of 0.020 mole per minute, maximum oxime formation occurred between 300 to 400 mm Hg partial pressure with operative limits of from 125 to 625 mm Hg. At an NOCl charge rate of 0.025 mole per minute, the maximum oxime formation and operative limits were similar to those conducted at a charge rate of 0.020 mole minute.

Table I below summarizes the results obtained in the presence or absence of washing agent. The data below were obtained using unfiltered mercury arc radiation.

amount of concentrated sulfuric acid contained therein.

In the first experiment, the unit was operated at 70°F.

TABLE I.—EFFECT OF IMMERSION WELL WASHING AGENT AND UNFILTERED RADIATION

| Example | A | B | C | D | E | F |
|---|---|---|---|---|---|---|
| Washing agent | None | 98% $H_2SO_4$ (1.2 g./min.) | 98% $H_2SO_4$ (3.0 g./min.) | 5% $H_2SO_4$ | 20% $H_2SO_4$ | 20% $SO_3$ in $H_2SO_4$ |
| Run time, hrs | 2 | 10 | 48 | 7 | 5 | 3 |
| Remarks | Extensive tar deposition | Extensive tar deposition; product 10% oxime. | Clean product 10% oxime. | No reaction. | No reaction. | Product ketones and amides. |

From the Table it will be seen that it was not possible to operate longer than 2 hours without an immersion well washing agent. Further, dilute sulfuric acid or fuming sulfuric acid washing agents either produced no reaction or reactions culminating in products consisting of ketones and amides. Where concentrated sulfuric acid was employed as the washing agent, oxime products were recovered. Table II summarizes the effect of filtered light on product formation.

and nitrosyl chloride was blown in along with hydrogen chloride at the rate of 0.025 mole per minute for about 24 hours. A pale yellow oxime oil was collected at the rate of 480 grams per kilowatt hour. Increasing the NOCl rate to 0.031 mole per minute yielded an oxime oil at the rate of 547 g/kwh. A further increase in the NOCl rate to 0.038 mole per minute yield an oxime oil at the rate of 580 g/kwh.

The 400 watt sodium arc lamp was then removed and

TABLE II.—EFFECT OF FILTERED LIGHT ON PRODUCT FORMATION

| Example | G | H | I | J |
|---|---|---|---|---|
| Washing agent | 98% $H_2SO_4$ | 98% $H_2SO_4$ | 98% $H_2SO_4$ | None. |
| Filter | None | Pyrex glass | Pyrex glass | Pyrex glass. |
| Average NOCl charge rate (mol./min.) | 0.020 | 0.010 | 0.020 | 0.020. |
| Average crude product rate (g./min.) | 1.08 | 1.0 | 1.47 | 1.1 (initial).* 0.5 (final). |
| Selectivity | 60% ketone 40% oxime | 94.5% oxime | 93.5% oxime | 90% oxime, tar deposition. |

*Rate declined as tar deposition increased.

From the examples above it can be seen that both product formation rate and selectivity were affected when light of preferred wavelengths, excluding wavelengths below 280 millimicrons was introduced into the reaction zone. Referring to Table II unfiltered light resulted in a crude product formation rate of about 1.0 gram per minute as can be seen from Example G. An equal level of productivity was achieved at half the NOCl charge rate with filtered radiation, see Example H. Further, the same NOCl charge rates resulted in a 50 percent oxime productivity increase as in Example I. The data in Table II also demonstrate that a selected range of radiation is necessary to achieve high reaction selectivity to oximes. Comparing Examples G, I, and J ketones were produced as a major product in G whereas high oxime selectivity resulted, when filtered radiation was applied in examples I and J.

EXAMPLE II

The photonitrosation apparatus equipped with a 400 watt Lucalox sodium arc lamp ("Lucalox" is a Registered trademark), having light emissions ranging from 380 to 760 millimicrons, where at least 50 percent of the lamp emission wavelengths are from about 550 to 650 millimicrons, was charged with 24 kilograms of a mixture of $C_{10}$ to $C_{13}$ n-paraffins. With the lamp operating, in the absence of a light filtering device, a nitrosating gas mixture of nitrosyl chloride and hydrogen chloride was blown into the reaction media and adjusted to maintain the NOCl partial pressure at 350 mm Hg and a total pressure of one atmosphere. The crude oxime oil which collected at the bottom of the reactor, along with the concentrated sulfuric acid used for the emission well wash, was drawn off as formed. Degassing was undertaken under vacuum with strong agitation. The amount of oxime formed over a given period of time was determined by weighing the degassed liquid effluent and subtracting the known replaced by a 550 watt mercury arc lamp. The unit operation was identical to that described with the sodium arc lamp except that the NOCl rate was 0.036 mole per minute and wavelengths less than 280 millimicrons were filtered by a Pyrex 7740 glass immersion well. A dark crude oxime oil was collected at the rate of 268 g/kwh.

The aforementioned experiments clearly demonstrate the superiority and efficiency of the sodium arc lamp over mercury arc lamps for the photonitrosation of n-paraffins in achieving higher conversion rates over twice the productivity level per unit of electrical input. In operation, the sodium arc lamp also obviates the necessity of filtering solutions and devices. The sodium arc lamp converts its electrical input energy directly into the visible light region in a highly efficient manner which excludes shorter wavelengths deleterious to photonitrosation reactions. This is realized through improved oxime quality as a result of reduced byproducts formation.

We claim:

1. A process for the manufacture of normal paraffin oximes which comprises:
   a. photochemically reacting a normal paraffin having from 10 to 13 carbon atoms with a gaseous nitrosating agent selected from the group consisting of nitrosyl halides, nitrosyl sulfuric acid, nitrogen oxide and chlorine, nitrogen peroxide and chlorine each alone and in admixture with hydrogen chloride, where said nitrosating agent partial pressure ranges from about 125 to 625 mm Hg under the influence of a sodium arc lamp providing essentially all light emission at a wavelength from about 380 millimicrons and up to about 760 millimicrons,
   b. separating the reacted normal paraffin and the reaction products of (a),
   c. neutralizing said separated reaction products of (b), and d. separating and recovering normal paraffin oximes.

2. A process according to claim 1 wherein the principal emission of said lamp is from about 550 to 650 millimicrons.

3. A process according to claim 1 wherein said nitrosating agent is nitrosyl chloride.

4. A process according to claim 1 wherein said reaction is conducted at a temperature of from 32° to 110°F.

5. A process according to claim 1 wherein said paraffin is a mixture of $C_{10}$ to $C_{13}$ n-paraffins.

6. A process according to claim 1 wherein said nitrosating agent partial pressure is from about 200 to 400 mm Hg.

7. A process according to claim 1 wherein a concentrated polybasic acid at least intermittently flows over the reaction surface of said reaction vessel.

8. A process according to claim 7 wherein said polybasic acid is sulfuric acid.

9. A process according to claim 8 wherein said acid is from 85 to 98 percent sulfuric acid.

10. A process according to claim 7 wherein said polybasic acid is phosphoric acid.

* * * * *

UNITED STATES PATENT OFFICE
CERTIFICATE OF CORRECTION

Patent No. 3,717,561          Dated February 20, 1973

Inventor(s) ORVILLE W. RIGDON, ROBERT S. EDWARDS, EDWARD H. HOLST

It is certified that error appears in the above-identified patent and that said Letters Patent are hereby corrected as shown below:

Col. 6    line 14      "20" should read -- 30 --

Signed and sealed this 27th day of November 1973.

(SEAL)
Attest:

EDWARD M. FLETCHER, JR.          RENE D. TEGTMEYER
Attesting Officer                Acting Commissioner of Patents